(12) United States Patent
Lee

(10) Patent No.: US 9,521,535 B2
(45) Date of Patent: Dec. 13, 2016

(54) ELECTRONIC DEVICE AND OPERATING METHOD USING BLUETOOTH

(71) Applicant: Samsung Electronics Co., Ltd., Gyeonggi-do (KR)

(72) Inventor: Sung-Geun Lee, Seoul (KR)

(73) Assignee: Samsung Electronics Co., Ltd., Yeontong-gu, Suwon-si, Gyeonggi-do (KR)

( * ) Notice: Subject to any disclaimer, the term of this patent is extended or adjusted under 35 U.S.C. 154(b) by 60 days.

(21) Appl. No.: 14/056,276

(22) Filed: Oct. 17, 2013

(65) Prior Publication Data

US 2014/0113562 A1 Apr. 24, 2014

(30) Foreign Application Priority Data

Oct. 19, 2012 (KR) ........................ 10-2012-0116711

(51) Int. Cl.
| | |
|---|---|
| *H04B 7/00* | (2006.01) |
| *H04B 1/38* | (2015.01) |
| *H04W 8/00* | (2009.01) |
| *H04W 8/26* | (2009.01) |

(52) U.S. Cl.
CPC .............. *H04W 8/005* (2013.01); *H04W 8/26* (2013.01)

(58) Field of Classification Search
CPC ....... H04B 1/1615; H04B 1/3816; H04B 7/26; H04W 4/008; H04W 8/26; H04W 76/02; H04W 84/20; H04M 1/3816; H04M 1/6066; H04M 1/7253; H04M 2250/02
USPC .................. 455/41.1, 41.2, 552.1, 553.1, 566
See application file for complete search history.

(56) References Cited

U.S. PATENT DOCUMENTS

| | | | |
|---|---|---|---|
| 6,522,283 B1 | 2/2003 | Shiga et al. | |
| 6,901,057 B2* | 5/2005 | Rune ...................... | H04W 84/20 370/310 |
| 7,436,300 B2* | 10/2008 | Glass et al. .................. | 455/41.1 |
| 7,711,324 B2* | 5/2010 | Wutka ..................... | G06F 3/038 455/41.2 |
| 8,045,961 B2* | 10/2011 | Ayed ........................ | G08B 1/08 455/41.1 |
| 8,095,071 B2* | 1/2012 | Sim et al. ..................... | 455/41.2 |
| 8,483,613 B2* | 7/2013 | Hua ....................... | H04W 76/02 455/41.1 |
| 8,760,553 B2* | 6/2014 | Hwang et al. ........... | 348/333.02 |
| 8,768,251 B2* | 7/2014 | Claus et al. ................. | 455/41.2 |
| 8,817,642 B2* | 8/2014 | Donaldson .............. | H04W 4/00 370/252 |
| 8,818,272 B2* | 8/2014 | Paryani .................. | H04B 1/202 455/404.1 |
| 2006/0261672 A1 | 11/2006 | Richter | |
| 2007/0197164 A1* | 8/2007 | Sheynman et al. .......... | 455/41.2 |
| 2007/0294556 A1* | 12/2007 | Wutka .......................... | 713/324 |

(Continued)

FOREIGN PATENT DOCUMENTS

KR 10-2005-0068693 A 7/2005

*Primary Examiner* — Quochien B Vuong
(74) *Attorney, Agent, or Firm* — Cha & Reiter, LLC

(57) ABSTRACT

A Bluetooth pairing method in an electronic device is provided. The method includes detecting a change of a switching state of a switch of the electronic device, selecting a Bluetooth Device (BD) address according to the changed switching state among a plurality of stored BD addresses, and applying the selected BD address to a Bluetooth pairing. The method can facilitate Bluetooth pairing to selectable types of host devices.

20 Claims, 6 Drawing Sheets

(56) References Cited

U.S. PATENT DOCUMENTS

2009/0319673 A1* 12/2009 Peters .................... H04W 4/08
709/228

* cited by examiner

ELECTRONIC DEVICE AND OPERATING METHOD USING BLUETOOTH

CLAIM OF PRIORITY

This application claims the benefit under 35 U.S.C. §119 (a) of a Korean patent application filed in the Korean Intellectual Property Office on Oct. 19, 2012 and assigned Serial No. 10-2012-0116711, the entire disclosure of which is hereby incorporated by reference.

BACKGROUND

1. Technical Field

The present disclosure relates to an electronic device that can easily establish a Bluetooth pairing with a peer device.

2. Description of the Related Art

With the advances in computing and telecommunications in recent years, portable wireless terminals such as smartphones, cell phones, electronic organizers, tablet PCs, Personal Digital Assistants (PDA), etc. have become necessities of modern life as an important means for delivering information which changes rapidly. Contemporary portable terminals provide various multimedia services in addition to traditional telephony functions.

In this environment, a Bluetooth communication technique has drawn attention in recent years. Bluetooth is a near field wireless communication technology defined as a standard by which various electronic devices and information communication devices are connected and controlled in a wireless fashion within a radius of 10 to 100 meters (m). When a wireless network is configured through Bluetooth, data can be freely exchanged between paired information devices. For example, data can be wirelessly exchanged at a high speed using a radio frequency between paired information devices (e.g., a computer, a printer, a mobile phone, a PDA, etc., used in home or an office) and also between a variety of digital home appliances equipped with Bluetooth functionality.

SUMMARY

An aspect of the presently disclosed technology is to provide an electronic device for easily establishing a Bluetooth pairing with a peer device.

Another aspect is to provide an electronic device for storing a plurality of Bluetooth Device (BD) addresses.

Still another aspect to provide an electronic device for storing a plurality of BD addresses, for selecting a specific BD address by using a switch manipulated by a user, and for applying the selected BD address to a Bluetooth pairing.

In an exemplary embodiment, a Bluetooth pairing method in an electronic device includes detecting a change of a switching state of a switch of the electronic device. A BD address is selected according to the changed switching state among a plurality of stored BD addresses. The selected BD address is applied to a Bluetooth pairing.

The method may further include removing a Bluetooth pairing with a specific host device which registers a previous BD address used before the selection. Further still, the method may include establishing a Bluetooth pairing with a specific host device which registers the selected BD address.

An embodiment of an electronic device includes a Bluetooth communication unit that establishes a Bluetooth pairing, a switching unit that changes a switching state, and a host unit to change a BD address of the Bluetooth communication unit for the Bluetooth pairing in response to the change in switching of the switching unit.

The electronic device may further include at least one of the following elements and features:

A memory for storing a plurality of BD addresses.

The host unit may change the BD address, and remove the Bluetooth pairing between the Bluetooth communication unit and a specific host electronic device which registers a previous BD address used before the change.

The host unit may change the BD address, and control the Bluetooth pairing between the Bluetooth communication unit and a specific host electronic device which registers the changed BD address.

The switching unit may be disposed on an external portion of a body, which forms an outer appearance of the electronic device, and allow a user's manipulation.

The switching unit may include a slide bar which is movable on the body, and change at least two switching states according to a position movement of the slide bar.

The switching unit may include a toggle switch.

An input unit may be included for generating an input signal or control signal transmitted to a Bluetooth-paired host electronic device via the Bluetooth communication unit.

An output unit for outputting a video signal or audio signal received from a Bluetooth-paired host electronic device via the Bluetooth communication unit may be included.

The electronic device can be a wireless keyboard, a wireless mouse, or a wireless speaker.

An embodiment of a keyboard includes a keypad unit constructed with keys to output input signals when the keys are pressed by a user, and a switching unit capable of changing a switching state by a user's manipulation. The keyboard includes a memory; a processor, communicatively connected to the keypad unit, the switching unit and a Bluetooth communication unit. The processor retrieves one of a plurality of Bluetooth Device (BD) addresses stored in the memory corresponding to the switching state of the switching unit, and changes a BD address for a Bluetooth pairing according to a change of the switching state. The Bluetooth communication unit transmits input signals from the keypad unit to a specific Bluetooth-paired host device under control of the processor.

BRIEF DESCRIPTION OF THE DRAWINGS

The above and other aspects, features and advantages of certain exemplary embodiments of the present technology will be more apparent from the following detailed description taken in conjunction with the accompanying drawings, in which.

DETAILED DESCRIPTION

Exemplary embodiments of the present technology will be described herein below with reference to the accompanying drawings. In the following description, well-known functions or constructions are not described in detail to avoid obscuring the present technology in unnecessary detail. Further, some terms used herein may differ from their ordinary usage. Therefore, the terms used herein should be understood on the basis of the description throughout this specification.

Figure 1A:
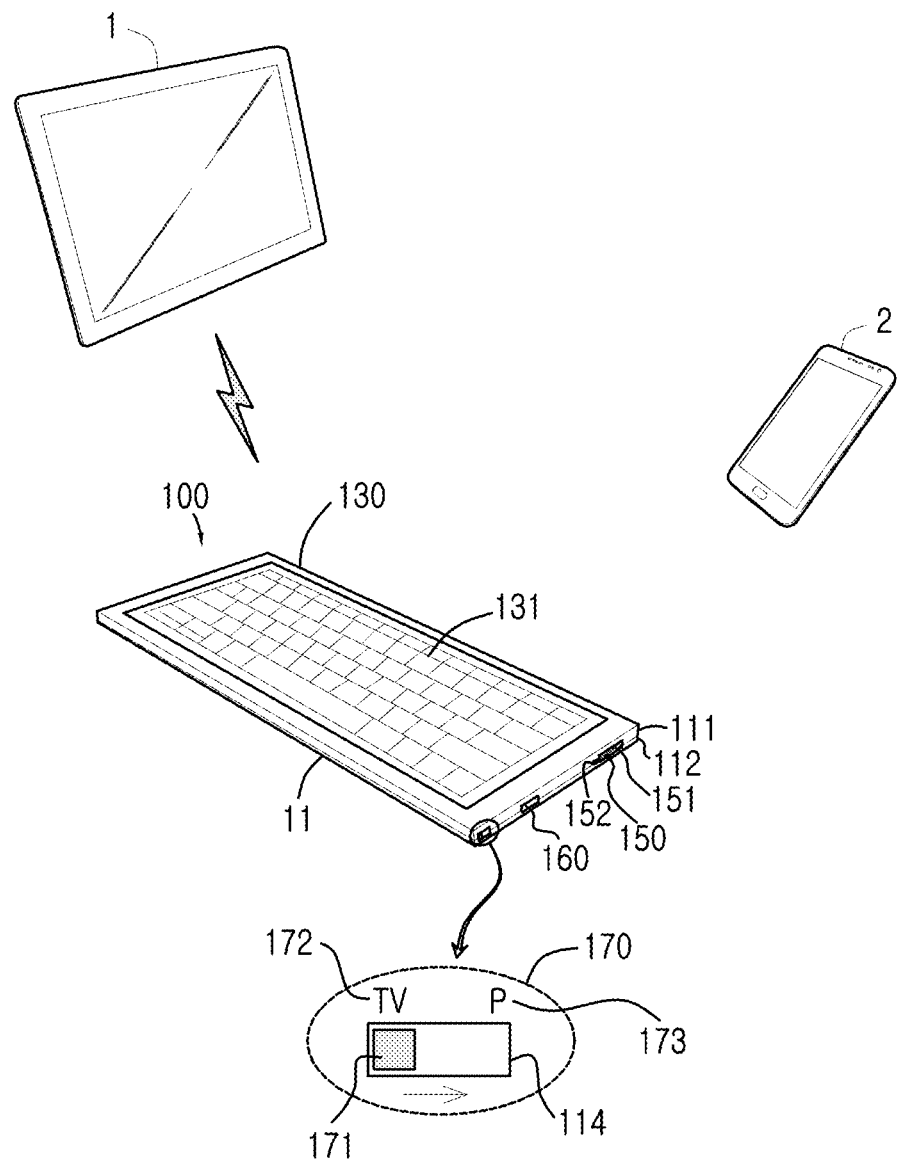
FIGS. 1A and 1B illustrate the concept of a pairing between Bluetooth electronic devices according to an exemplary embodiment.
Figure 1B:
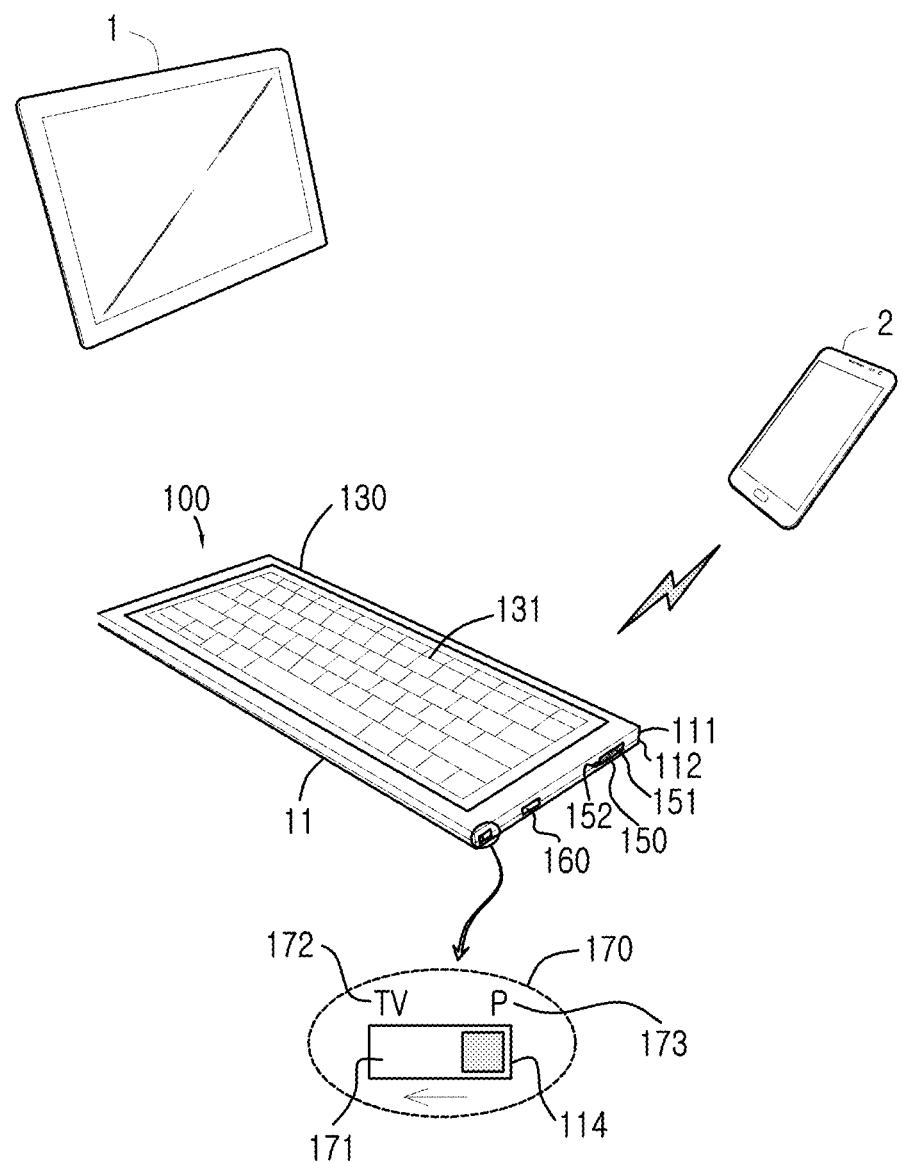

FIGS. 1A and 1B illustrate the concept of a pairing between Bluetooth electronic devices according to an exemplary embodiment of the present technology.

A host electronic device (e.g., a Television (TV) 1, a mobile phone 2, etc.) searches for a neighbor electronic device (e.g., a keyboard 100, etc.) for performing a pairing between electronic devices. The Bluetooth devices need to be paired to configure a wireless network through Bluetooth. A pairing is defined as an operation in which a device and its peer device to be connected mutually recognize their presence.

In general, the host electronic device (hereafter, "device") searches for a neighbor device by using a well-known Service Discovery Profile (SDP). Here, the host and neighbor devices exchange a Bluetooth Device (BD) address (e.g., 00:11:22:33:44:55) and a device name. In the present example, when the TV 1 or phone 2 searches and discovers the keyboard 100, the BD address sent by the keyboard 100 is a unique identification assigned to it. The device name may be a serial number of the keyboard 100.

When the host device receives the BD address of the neighbor device, it registers the address. In one pre-set scheme, if the neighbor device is found through a search operation, the host device can be automatically paired with the neighbor device. In one implementation, the host device and the neighbor device registered to the host device can be automatically paired without having to receive a separate authentication such as a passkey based on a Secure Simple Pairing (SSP) which is input from a user.

As will be explained further below, keyboard 100 includes a manual switch (switching unit 170) to enable a rapid manual selection between Bluetooth devices, in accordance with an embodiment. The switching unit 170 can move a slide bar 171 to two or more positions. According to the movement of the slide bar 171, a processor changes a connection state by changing a BD address. A memory stores a plurality of BD addresses, and the processor selects a specific BD address according to a switching state of the switching unit 170 for Bluetooth pairing with a host device that registers the new address. For instance, in FIG. 1A, the slide bar 171 is slid to a first position ("TV") for Bluetooth pairing with the TV 1, whereupon the TV 1 registers a first BD address provided by the keyboard 100 and Bluetooth communication with the TV 1 is performed. User inputs on keyboard 100 are then converted to commands controlling the TV 1. Likewise, as shown in FIG. 1B, when the slide bar 171 is slid to a second position "P" corresponding to a phone, Bluetooth communication is switched to the phone 2, via the use of a second BD address provided by the keyboard 100. The phone 2 can then be controlled via inputs to keyboard 100.

When the switching unit 170 switch is switched to the "TV" position, keyboard 100 retrieves the first BD address from memory and advertises itself with the first BD address for Bluetooth pairing. In this case, in order for a Bluetooth connection to proceed with a TV but not with a phone, keyboard 100 takes appropriate measures. For instance, when the switch is in the TV position, the keyboard employs software that does not permit its use with a phone. Thus when a phone attempts to make a Bluetooth connection under this condition, the keyboard 100 software does not permit it. For example, when the switch is in the TV position, the keyboard advertises itself as a device that is compatible with a TV but not compatible with a phone. Similarly, when the switch is in the "P" position, keyboard 100 retrieves a second BD address from memory for Bluetooth communication, and can identify itself with this second address as a different device. That is, it advertises itself as a different device does not permit Bluetooth pairing with a TV host device, but only with a phone host device. In this manner, user inputs to the keyboard 100 will control the phone 2, but not the TV 1.

In a particular embodiment, the keyboard 100 includes a body 11, a keypad unit 130, a speaker unit 150, an external port unit 160, and a switching unit 170. The body 11 forms an outer appearance of keyboard 11 in e.g., a quadrangular plate shape, and is a housing for internal electronics. The body 11 can be divided into an upper body 111 and a lower body 112, and is formed by molding.

The keypad unit 130 arranges a plurality of keys 131, for example, number keys, character keys, symbol keys, etc. Keypad unit 130 is disposed beneath the buttons 131, and includes a circuit board (not shown) contained in the body 11. The keypad unit 130 is joined to the body 11, and the keys 131 are exposed. When the keys 131 are pressed by the user, the circuit board handles signals corresponding to the pressed keys.

The keys 131 may be a well-known membrane or pantograph type. A membrane-type key includes a keycap, a rubber done, and a key electrode. The pantograph type includes a keycap, a rubber done, and a key electrode.

The circuit board includes a Bluetooth communication unit (item 140 in FIG. 2) for Bluetooth communication. The Bluetooth communication unit includes software and hardware constituent elements to enable the Bluetooth communication, and for example, includes a chip for processing a radio signal and an antenna for transmitting and receiving the radio signal. The Bluetooth communication unit is assigned a BD address for the keyboard 100, for a Bluetooth pairing with the host device.

The audio unit 150 outputs an audio signal received from the paired host device. In addition, the audio unit 150 comprises a speaker 151 and an earphone connector 152.

The external port unit 160 can connect an external memory to the circuit board to transfer data to each other. The circuit board can transmit the data of the external memory to the host device. The circuit board may transfer data received from the host device into the external memory for storage.

The switching unit 170 is electrically connected to the circuit board, and is exposed at a suitable place in the body 11. The switching unit 170 includes a manual slide bar 171 movable to two or more positions. According to the movement of the slide bar 171, a circuit changes a switching state. In particular, if the switching state changes according to the movement of the slide bar 171, a circuit board processor changes a BD address. A memory stores a plurality of BD addresses, and the processor selects a specific BD address according to a switching state of the switching unit 170. The processor provides the selected BD address to the Bluetooth communication unit to be used as the current BD address of keyboard 100 in the Bluetooth pairing with the host device.

The body 11 forms a slide groove 114 for guiding a movement of the slide bar 171. Marks 172 and 173 for indicating a movement position of the slide bar 171 are printed on the surface of the body 11. The marks 172 and 173 indicate selectable host devices to be paired.

If the slide bar 171 of the switching unit 170 is moved to a position of the first mark 172 (i.e., TV), the processor applies a first BD address. In this case, the TV 1 which registers the first BD address is paired with the keyboard 100. If the slide bar 171 is moved to a position of the second mark 173 (i.e., "P" for phone), the processor applies a second BD address. In this case, the mobile phone 2 which registers the second BD address is paired with the keyboard 100. If the BD address is changed, a connection with a host device paired by using a previous BD address (used before change) is removed. When the BD address is changed, the processor prepares a pairing with a host device which conforms to the changed BD address. For instance, if the switch is in the TV position, the processor may prevent a non-TV host device such as a phone from establishing a Bluetooth pairing, while allowing a Bluetooth pairing with a host device identifying itself as a TV. The switching unit 170 is not limited to the aforementioned method of moving the slide bar 171, and thus can be implemented in various manners. For example, the switching unit 170 may alternatively be a toggle switch.

Accordingly, the user can effectively and rapidly establish a pairing with a desired host device by simply moving the slide bar 171 of the switching unit 170.

Figure 2:
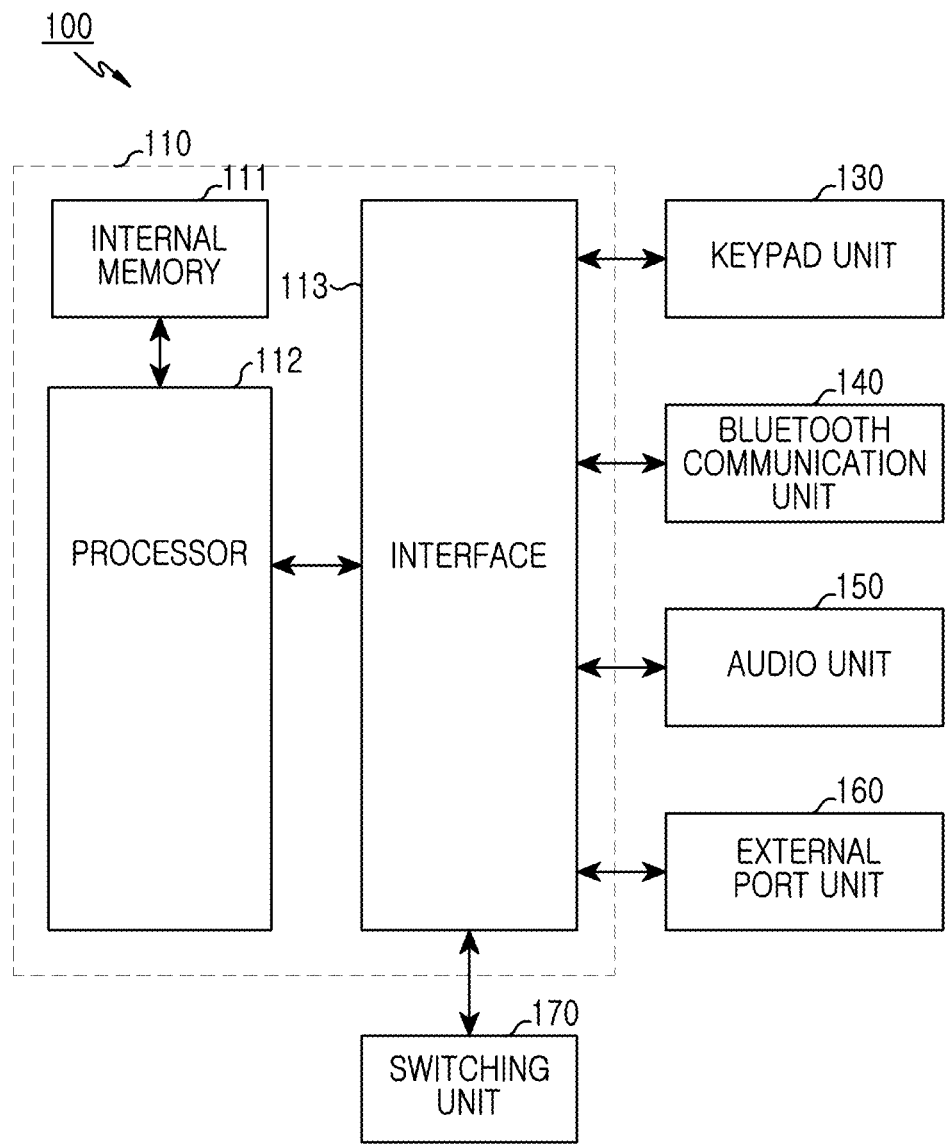
FIG. 2 is a block diagram illustrating a structure of a keyboard according to an exemplary embodiment.

FIG. 2 is a block diagram illustrating an example structure of a keyboard 100 according to an exemplary embodiment. Keyboard 100 may communicate with a host device (e.g., a mobile phone, a mobile pad, a media player, a tablet computer, a handheld computer, or a Personal Digital Assistant (PDA)) through Bluetooth, transmit a key input signal to the host device, and receive an output signal from the host device.

The keyboard 100 includes a host unit 110, a keypad unit 130, a Bluetooth communication unit 140, an audio unit 150, an external port unit 160, and a switching unit 170. The external port unit 160 may each be plural in number.

The host unit 110 includes an internal memory 111, one or more processors 112, and an interface 113. The internal memory 111, the one or more processors 112, and the interface 113 may be separate elements or may be configured in one or more Integrated Circuits (ICs).

The processor 112 performs several functions for the keyboard 100 by executing various software programs, and processes and controls data communication. Further, in addition to typical functions, the processor 112 executes a software module (or an instruction set) stored in the internal memory 111 and/or the external memory unit (not shown) and thus performs various functions corresponding to the module. That is, the processor 112 performs the method according to the exemplary embodiment of the present invention by interworking with the software module stored in the internal memory 111 and/or the external memory unit. That is, if a switching state is changed by the switching unit 170, the processor 112 changes a BD address stored in the internal memory 111 or the external memory unit, and sends the changed BD address to Bluetooth communication unit 140 for a Bluetooth pairing with the host device. The external memory unit can include a fast random access memory such as one or more magnetic storage devices and/or a non-volatile memory, one or more optical storage devices, and/or a flash memory (e.g., NAND, NOR). The external memory unit stores a software element. The software element refers to a module including a set of instructions (or an instruction set). In addition, the external memory unit can be used to store a plurality of BD addresses.

The interface 113 connects the host unit 110 to several elements of the keyboard 100.

The keypad unit 130 consists of a plurality of keys, and transmits a signal to the host unit 110 according to a key pressed by the user. The host unit 110 transmits a signal, which is received from the keypad unit 130, to the paired host device via the Bluetooth communication unit 140.

The Bluetooth communication unit 140 includes software and hardware constituent elements for the Bluetooth communication, and for example, includes a chip for processing a radio signal and an antenna for transmitting and receiving the radio signal. The host unit 110 assigns to the Bluetooth communication unit 140 the BD address for the Bluetooth pairing with the selected type of host device.

The audio unit 150 produces audio output via the speaker and the earphone connector. The audio unit 150 receives a data signal from the host unit 110, converts the received data signal into an electronic signal, and outputs the converted electronic signal via the speaker or the earphone connector.

The external port unit 160 may connect an external memory. The external port unit 160 may connect a charging device for charging of the keyboard 100. The host unit 110 and the external memory are connected through the external port unit 160, and can transmit data to each other. The host unit 110 can transmit the data of the external memory to the host device. In addition, the host unit 110 may store data received from the host device paired through the Bluetooth communication unit 140 into the external memory.

The switching unit 170 allows the user to change the connection state, by changing the switching state thereof.

Keyboard 100 can also be equipped with a small display unit (not shown) for outputting still image and/or video signals, and to facilitate operations.

Figure 3:
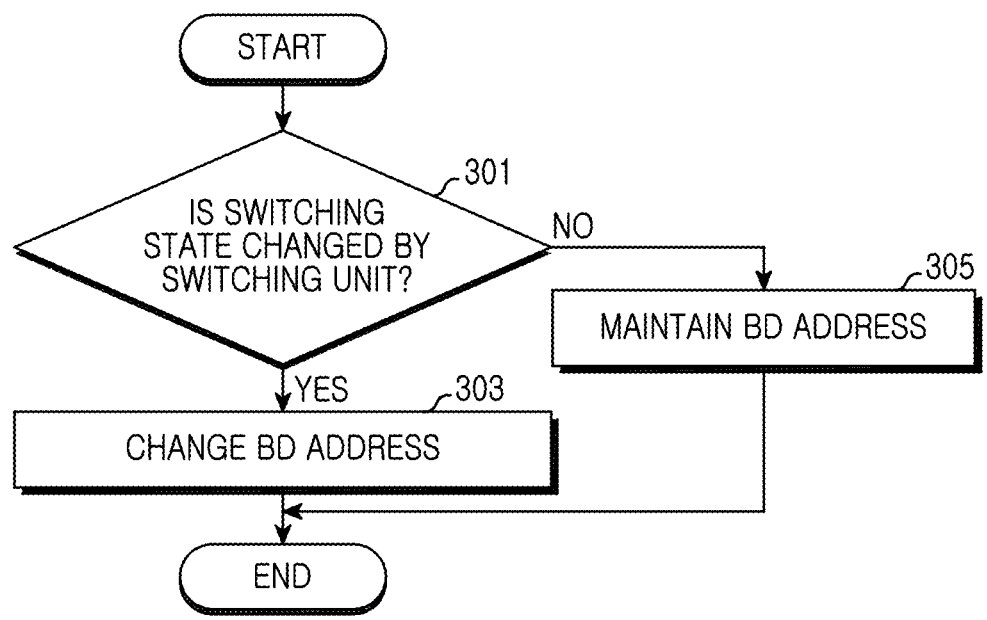
FIG. 3, FIG. 4 and FIG. 5 are flowcharts illustrating respective operations of a keyboard according to an exemplary embodiment.

FIG. 3 is a flowchart illustrating an operating method of keyboard 100 according to an exemplary embodiment of the present invention. At the outset of the operation, it is assumed that keyboard 100 may or may not have already established a Bluetooth connection with a first host device, and if it has been established, a current BD address was assigned to keyboard 100 for that connection. If there is no connection (e.g., if the first host device is turned off, or if the keyboard 100 location has moved outside the range of the first host device or vice versa), then the processor 112 nevertheless maintains the current BD address in memory.

In step 301, the processor 112 determines whether a switching state corresponding to a desired connection state is changed by the switching unit 170. If the switching state is changed, processor 112 changes the keyboard 100's BD address for Bluetooth communication in step 303. Otherwise, the processor 112 maintains the current BD address in step 305.

Figure 4:
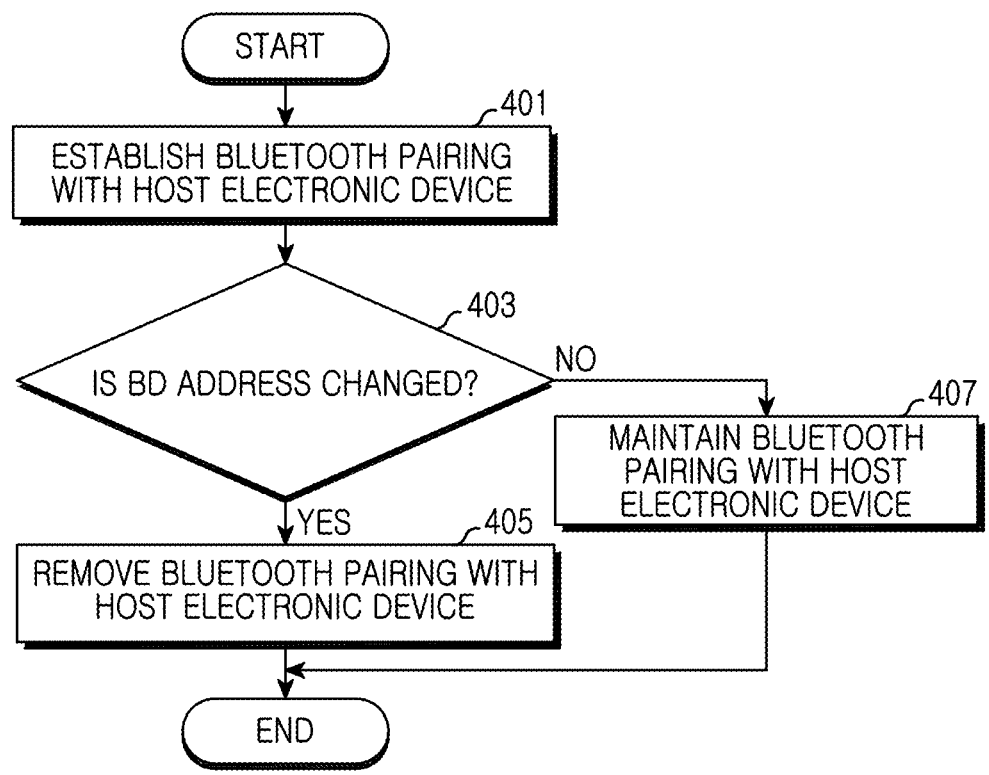

FIG. 4 is a flowchart illustrating an operating method of keyboard 100 according to an exemplary embodiment of the present invention. In step 401, processor 112 establishes a Bluetooth pairing with a host device. Next, in step 403, the processor 112 determines whether the BD address should be changed by detecting whether the switching state (e.g., switch position between "TV" and "P") of the switching unit 170 has changed. If so, the processor 112 changes the BD address accordingly.

If the BD address is changed, the processor 112 removes the Bluetooth pairing with the host device in step 405. Otherwise, processor 112 maintains the Bluetooth pairing with the host device in step 407.

Figure 5:
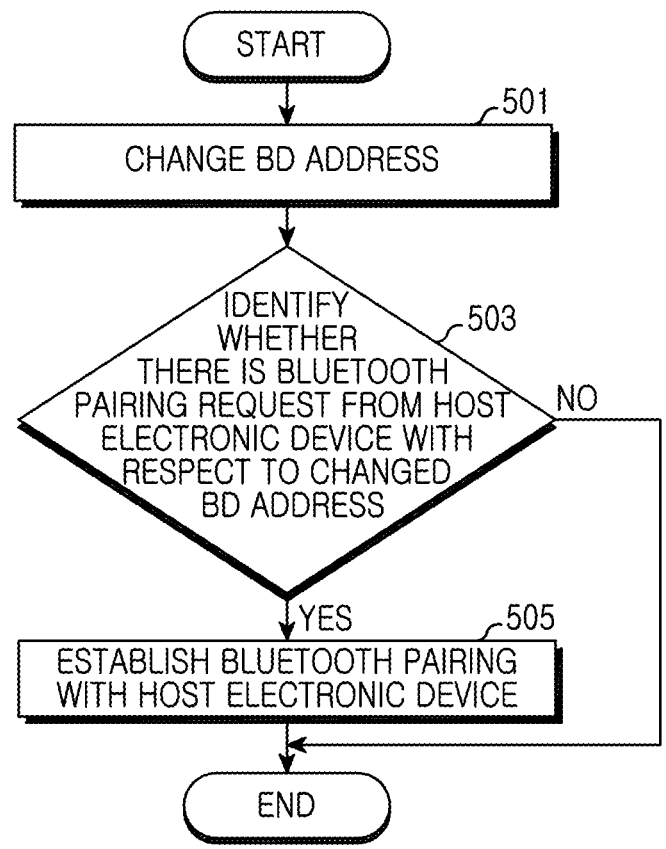

FIG. 5 is a flowchart illustrating an operation of a keyboard according to an exemplary embodiment of the present invention. In step 501, the processor 112 changes a BD address according to a switching state changed by the switching unit 170. When the BD address is thus changed, Bluetooth communication unit 140 transmits Bluetooth signals which identify keyboard 100 differently, i.e., with the changed BD address. Next, in step 503, the processor 112 identifies whether there is a Bluetooth pairing request from a host device, with respect to the changed BD address. If so, in step 505, the processor 112 establishes a Bluetooth pairing with the target host device, provided that the host device conforms to the type of device (e.g., TV or phone) associated with the switching state.

Otherwise, if there is no Bluetooth pairing request from the desired type of host device, the procedure of FIG. 5 ends.

In the above exemplary embodiments, the plurality of BD addresses stored in memory correspond to different BD addresses the keyboard 100 associates with itself during a Bluetooth pairing process. In an alternative embodiment, keyboard 100 always uses the same BD address for itself, but changes BD addresses that it compares with BD addresses of host devices. For example, in a set-up mode, keyboard 100 gathers BD addresses of various specific host devices that it may be allowed to connect to. In a simple example, keyboard 100 obtains a first BD address of a specific TV and a second BD address of a specific phone that the user places in vicinity to the keyboard. These BD addresses are then stored in the internal or external memories. Thereafter, whenever the switching unit 170 is switched to the TV position, keyboard 100 utilizes only the first BD address to communicate with any potential host device. Then, a Bluetooth pairing is permitted only when a potential host device identifies itself with the first BD address. This prevents other devices such as phones or other TVs from receiving unintended commands from the keyboard 100. When the switching unit 170 is switched to the "P" position, keyboard 100 drops the connection with the TV associated with the first BD address, and the keyboard attempts to discover a phone device that identifies itself with the second BD address.

It is noted, in the alternative embodiment just described, in which keyboard 100 does not change its own BD address, a plurality of BD addresses corresponding to particular host devices are pre-stored in the internal memory 110 and/or external memory (not shown). These BD addresses can be obtained in a number of ways. In one implementation, a user may manually enter the BD addresses, and manually enter default BD addresses for e.g., a default TV and a default phone, to deal with situations where multiple TVs or phones might be within Bluetooth communication range of the keyboard 100. In another implementation, when the keyboard 100 is used for the first time, it will search for a Bluetooth-capable TV with the highest signal strength, and attempt to pair with that TV. If pairing is successful, the keyboard will assume that that TV is the intended one, and will obtain its BD address and store it as a default BD address for a TV in memory. A similar operation is performed to select a default phone with a corresponding BD address. In this manner, if multiple phones are in the vicinity of the keyboard, and the switching state of the switching unit 170 is switched to "P", keyboard 100 will attempt to pair with the default phone using the originally obtained BD address.

In the above exemplary embodiments, although a keyboard is described as an example of an input means, the present invention is not limited thereto. Thus, an electronic device (e.g., a wireless earphone, a wireless mouse, a wireless speaker, etc.) that can be paired with a host device can also perform the procedures of FIG. 3 to FIG. 5, and include constituent elements thereof Although the electronic device may have a structure differing from that of FIG. 2, an electronic device of the present invention may commonly consist of elements corresponding to the host unit 110, the Bluetooth communication unit 140, and the switching unit 170.

For example, the wireless earphone may comprise a host unit, a Bluetooth communication unit, a switching unit, and a speaker unit which are configured on at least one circuit board. The switching unit is placed in a suitable position in the wireless earphone, and changes the switching state of the circuit board to an intended host device connection state according to a user's manipulation. The host unit detects that the switching state is changed by the switching unit, and changes a BD address assigned to the Bluetooth communication unit. The speaker unit outputs an audio signal received from the Bluetooth-paired host device.

According to exemplary embodiments of the present invention, an electronic device can change a Bluetooth Device (BD) address by using a switch manipulated by a user, and can automatically establish a Bluetooth pairing with a host device which registers the changed BD address, thereby providing user convenience.

Methods based on the embodiments disclosed in this document can be implemented in hardware, software, or a combination of both. When implemented in software, computer readable recording medium for storing one or more programs (i.e., software modules) can be provided. The one or more programs stored in the computer readable recording medium are configured for execution performed by one or more processors in an electronic device such as a Bluetooth-capable device or a portable terminal. The one or more programs include instructions for allowing the electronic device to execute the methods based on the embodiments disclosed in this document.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the memory configured may be plural in number. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can be accessed by an electronic device via an external port.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A Bluetooth communication method in an electronic device, comprising:

establishing a Bluetooth communication with a first external device by using a Bluetooth address of the first external device;
transmitting a signal which is generated from the electronic device to the first external device via the established Bluetooth communication;
establishing a Bluetooth communication with a second external device by using a Bluetooth address of the second external device, if the second external device is selected by a switching unit;
transmitting a signal which is generated from the electronic device to the second external device via the established Bluetooth communication; and
wherein the Bluetooth addresses of the first external device and the second external device are stored in the electronic device, and
wherein the electornic device comprises at least one display unit to display a status of the Bluetooth communication with the first or second external device.

2. The Bluetooth communication method of claim 1, further comprising dropping the Bluetooth communication with the first external device, if the second external device is selected by the switching unit.

3. The Bluetooth communication method of claim 1, wherein the electronic device comprises a body,
wherein the body includes a mark indicating to select at least one of the first external device and second external device,
wherein the mark is printed on at least one region related with the switching unit.

4. The Bluetooth communication method of claim 1, wherein the switch unit comprises a toggle switch or a slide bar.

5. The Bluetooth communication method of claim 1, wherein the electronic device comprises a memory,
wherein the memory stores the Bluetooth addresses of the first external device and the second external device.

6. The Bluetooth communication method of claim 5, wherein the stored Bluetooth addresses of the first external device and the second external device in the memory are maintained when the first external device and the second external device are turned off or the electronic device is out of a range of the Bluetooth communication.

7. The Bluetooth communication method of claim 1, wherein the electronic device comprises a keyboard.

8. An electronic device comprising:
a Bluetooth communication unit
a switching unit; and
a host unit to control the Bluetooth communication unit to:
establish a Bluetooth communication with a first external device by using a Bluetooth address of the first external device,
transmit a signal which is generated from the electronic device to the first external device via the established Bluetooth communication;
establish a Bluetooth communication with a second external device by using a BD address of the second external device, if the second external device is sleeted by the switching unit and
transmit a signal which is generated from the electronic device to the second external device via the established Bluetooth communication,
wherein the Bluetooth addresses of the first external device and the second external device are stored in the electronic device,
wherein the electronic device comprises at least one display unit to display a status of the Bluetooth communication with the first or the second external device.

9. The electronic device of claim 8,
wherein the Bluetooth communication unit drops the Bluetooth communication with the first external device, if the second external device is selected by the switching unit.

10. The electronic device of claim 8,
wherein the electronic device comprises a body,
wherein the body includes a mark indicating to select at least one of the first external device and second external device,
wherein the mark is printed on at least one region related with the switching unit.

11. The electronic device of claim 8,
wherein the switch unit comprises a toggle switch or a slide bar.

12. The electronic device of claim 8,
wherein the electronic device comprises a memory,
wherein the memory stores the Bluetooth addresses of the first external device and the second external device.

13. The electronic device of claim 12,
wherein the stored Bluetooth addresses of the first external device and the second external device in the memory are maintained when the first external device and the second external device are turned off or the electronic device is out of a range of the Bluetooth communication.

14. The electronic device of claim 8,
wherein the electronic device comprises a keyboard.

15. An electronic device comprising:
a Bluetooth communication unit
a switching unit; and
a host unit to control the Bluetooth communication unit to:
establish a Bluetooth communication with a first external device by using a Bluetooth address of the first external device,
transmit a signal which is generated from the electronic device to the first external device via the established Bluetooth communication;
establish a Bluetooth communication with a second external device by using a Bluetooth address of the second external device, if the second external device is selected by the switching unit and
transmit a signal which is generated from the electronic device to the second external device via the established Bluetooth communication,
wherein the Bluetooth addresses of the first external device and the second external device are stored in the electronic device, wherein the switching unit is disposed on an external portion of the electronic device,
wherein the electronic device comprises at least one display unit to display a status of the Bluetooth communication with the first or the second external device.

16. The electronic device of claim 15, wherein the Bluetooth communication unit drops the Bluetooth communication with the first external device, if the second external device is selected by the switching unit.

17. The electronic device of claim 15, wherein the electronic device comprises a body, wherein the body includes a mark indicating to select at least one of the first external device and second external device, and wherein the mark is printed on at least one region related with the switching unit.

18. The electronic device of claim 15, wherein the switch unit comprises a toggle switch or a slide bar.

19. The electronic device of claim 15, wherein the electronic device comprises a memory, wherein the memory stores the Bluetooth addresses of the first external device and the second external device.

20. The electronic device of claim 15, wherein the stored Bluetooth addresses of the first external device and the second external device in the electronic device are maintained when the first external device and the second external device are turned off or the electronic device is out of a range of the Bluetooth communication.

* * * * *

UNITED STATES PATENT AND TRADEMARK OFFICE
CERTIFICATE OF CORRECTION

| | | |
|---|---|---|
| PATENT NO. | : 9,521,535 B2 | Page 1 of 2 |
| APPLICATION NO. | : 14/056276 | |
| DATED | : December 13, 2016 | |
| INVENTOR(S) | : Sung-Geun Lee | |

It is certified that error appears in the above-identified patent and that said Letters Patent is hereby corrected as shown below:

In the Claims

Column 9, Claim 1, Line 17 should read as follows:
--...the electronic device comprises...--

Column 9, Claim 3, Lines 28-29 should read as follows:
--...device, and wherein the...--

Column 9, Claim 5, Lines 35-36 should read as follows:
--...memory, and wherein the...--

Column 9, Claim 8, Lines 48-49 should read as follows:
--...communication unit; a switching...--

Column 9, Claim 8, Lines 54-55 should read as follows:
--...external device; transmit a...--

Column 9, Claim 8, Lines 57-58 should read as follows:
--...Bluetooth communication; establish a...--

Column 9, Claim 8, Line 61 should read as follows:
--...selected by the switching...--

Column 9, Claim 8, Line 61 should read as follows:
--...the switching unit; and...--

Column 9, Claim 8, Line 67 should read as follows:
--...electronic device, and...--

Signed and Sealed this
Seventh Day of February, 2017

Michelle K. Lee
*Director of the United States Patent and Trademark Office*

CERTIFICATE OF CORRECTION (continued)
U.S. Pat. No. 9,521,535 B2

Column 10, Claim 10, Lines 13-14 should read as follows:
--...device, and wherein the...--

Column 10, Claim 15, Lines 33-34 should read as follows:
--...communication unit; a switching...--

Column 10, Claim 15, Lines 39-40 should read as follows:
--...external device; transmit a...--

Column 10, Claim 15, Line 46 should read as follows:
--...the switching unit; and...--

Column 10, Claim 15, Lines 53-54 should read as follows:
--...device, and wherein the...--